(12) United States Patent
Roy et al.

(10) Patent No.: US 11,262,468 B2
(45) Date of Patent: Mar. 1, 2022

(54) MACHINE LEARNING-BASED ANALYSIS OF SEISMIC ATTRIBUTES

(71) Applicant: BP Corporation North America Inc., Houston, TX (US)

(72) Inventors: Atish Roy, Houston, TX (US); Dhananjay Kumar, Katy, TX (US); Eric Kazlauskas, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 223 days.

(21) Appl. No.: 16/568,352

(22) Filed: Sep. 12, 2019

(65) Prior Publication Data

US 2020/0088897 A1   Mar. 19, 2020

Related U.S. Application Data

(60) Provisional application No. 62/731,411, filed on Sep. 14, 2018.

(51) Int. Cl.
| | | |
|---|---|---|
| *G01V 1/28* | (2006.01) | |
| *G01V 1/30* | (2006.01) | |
| *G06N 20/00* | (2019.01) | |

(52) U.S. Cl.
CPC .............. *G01V 1/303* (2013.01); *G01V 1/282* (2013.01); *G01V 1/306* (2013.01); *G06N 20/00* (2019.01); *G01V 2210/6222* (2013.01); *G01V 2210/6224* (2013.01)

(58) Field of Classification Search
USPC .......................................................... 702/18
See application file for complete search history.

(56) References Cited

U.S. PATENT DOCUMENTS

| 6,374,185 B1 | 4/2002 | Taner et al. |
| 2020/0301036 A1* | 9/2020 | Ramfjord .................. E21B 7/04 |

FOREIGN PATENT DOCUMENTS

WO     2018/148492 A1    8/2018

OTHER PUBLICATIONS

International Search Report and Written Opinion dated Dec. 10, 2019, for PCT/US2019/050720, filed on Sep. 12, 2019.
D. Balz et al. Reservoir Characterisation Using Neural Networks Controlled by Petrophysical and Seismic Modelling. XP055474608.

* cited by examiner

*Primary Examiner* — Paul D Lee
(74) *Attorney, Agent, or Firm* — Conley Rose, P.C.

(57) ABSTRACT

Systems and methods are disclosed that include generating reservoir property profiles corresponding to reservoir properties for pseudo wells based on reservoir data, generating seismic attributes for the pseudo wells, and training a machine learning model by comparing the reservoir property profiles against the seismic attributes. In this manner, the machine learning model may be used to predict reservoir properties for use with seismic exploration above a region of a subsurface that contains structural or stratigraphic features conducive to a presence, migration, or accumulation of hydrocarbons.

20 Claims, 7 Drawing Sheets

MACHINE LEARNING-BASED ANALYSIS OF SEISMIC ATTRIBUTES

CROSS-REFERENCE TO RELATED APPLICATIONS

This application claims benefit of U.S. provisional application Ser. No. 62/731,411 filed Sep. 14, 2018, and entitled "Machine Learning-Based Analysis of Seismic Attributes," which is hereby incorporated herein by reference in its entirety for all purposes.

STATEMENT REGARDING FEDERALLY SPONSORED RESEARCH OR DEVELOPMENT

Not applicable.

TECHNICAL FIELD

The present disclosure relates generally to analyzing seismic attributes and reservoir properties, and more specifically, to using machine learning to analyze the relationship between seismic attributes and reservoir properties. Seismic attributes of seismic data can include, at least, frequency-dependent amplitude variation with offset (FAVO) responses, analytical seismic attributes (such as, for example, quadrature traces and/or envelopes), and inverted seismic attributes (such as, for example, impedance, density, and/or reflectivity). Reservoir properties can include, at least, a rock's fluid content, porosity, density or seismic velocity, shear wave information, and/or fluid indicators (hydrocarbon indications), for example. In general, a seismic attribute can be considered to be a calculation/representation that enhances a correlation between a seismic amplitude and a reservoir property of interest.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Seismic analysis or surveying includes generating an image or map of a subsurface region of the Earth by sending sound (seismic) energy down into the ground and recording the reflected sound energy that returns from the geological layers within the subsurface region. Seismic imaging attempts to generate a representation of the reservoir properties of the relevant subsurface region.

When sending waves of sound energy into the ground, the waves can scatter through a stack of geological layers (within a reservoir, for example) to produce temporal frequency dependent seismic amplitudes. The characteristics of the scattering can be recorded by a corresponding frequency amplitude versus offset (FAVO) response. Captured FAVO responses can then be analyzed to draw an inference upon the reservoir properties of the subsurface region. For example, FAVO responses can be analyzed to infer upon the subsurface region's fluid content, porosity, density or seismic velocity, shear wave information, and/or fluid indicators (hydrocarbon indications) based on a seismic attribute (i.e., the amplitude), and also based on the distance between a source and a receiver (i.e., the offset). Because FAVO-based seismic analysis can take into account various geological layer properties (e.g., layer thickness, seismic velocity, density) and incident wave properties (e.g., angle and frequency), and because the geological layer properties may themselves be dependent on rock and fluid, or reservoir properties (e.g., layer thickness, lithology, fluid, etc.), a resulting FAVO response of the analysis can be complex valued, which can be represented with real components and also with imaginary components, or as absolute amplitude and phase, as a function of frequency. A captured FAVO response, then, can be multidimensional, and may be difficult to interpret when compared to other types of responses that are captured by conventional seismic interpretation methods, such as conventional amplitude variation with offset (AVO) seismic analysis. FAVO is an example seismic attribute and is highlighted to understand the process. This process is applicable to other seismic attributes or pre-stack seismic CDP sorted gathers as well.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Machine learning can be used to analyze seismic attributes. For example, one or more embodiments can implement a machine-learning system in order to analyze a relationship/correlation between at least one seismic attribute and at least one reservoir property. Specifically, with one or more embodiments, machine learning can be used to analyze frequency-dependent amplitude variation with offset (FAVO) responses in order to predict at least one reservoir property that is associated with the analyzed FAVO responses. Further, in addition to analyzing FAVO responses, other embodiments can use machine learning techniques to analyze analytical seismic attributes and/or inverted seismic attributes, for example. Although certain embodiments can analyze FAVO responses, other embodiments can analyze other types of seismic attributes. Specifically, aside from FAVO, other seismic attributes can be used as inputs. Further, other types of seismic attributes can be used in conjunction with FAVO responses for performing reservoir property prediction.

In order to train a machine-learning system to learn relationships/correlations between seismic attributes and reservoir properties, the machine-learning system compares the seismic attributes of a well against a set of reservoir properties of the same well (i.e., the reservoir property profile of the well). After performing numerous comparisons between the seismic attributes of numerous wells against numerous corresponding reservoir property profiles of the same wells, the machine-learning system can learn the relationships/correlations between the seismic attributes and the reservoir properties.

However, training the machine-learning system can be difficult because the process of obtaining each reservoir property profile of a well and the process of obtaining the seismic attributes of the well can be time consuming as well as costly. For example, with conventional methods, a surveyor would generally need to physically perform a survey on a seismic region, physically drill a hole at the seismic region, and physically perform the necessary measurements.

The surveyor would then have one reservoir property profile and one set of seismic attributes that can be used to train the machine-learning system. Therefore, in order to train the machine-learning system using hundreds or thousands of reservoir property profiles, the surveyor would need to perform hundreds or thousands of physical surveys and digs.

In contrast to the conventional methods, one more embodiments can train the machine-learning system using simulated reservoir property profiles and simulated seismic attributes. In other words, as described in more detail below, one or more embodiments can generate simulated reservoir property profiles for a plurality of simulated wells (i.e., "pseudo-wells"), and one or more embodiments can generate seismic attributes for these pseudo-wells. In particular, for a given reservoir, a plurality of pseudo-wells can be generated. Each pseudo-well can be generated based on the actual seismic data of the reservoir from which the pseudo-well is derived. Thus, for pseudo-wells that share a reservoir, reservoir property profiles can be generated for these pseudo-wells based on the actual seismic data of the shared reservoir (e.g., reservoir data). A reservoir property profile of a pseudo-well can include properties such as, for example, thickness, lithology, fluid, sand ratio, shale ratio, etc., of the pseudo-well.

With one or more embodiments, the simulated seismic attributes for a pseudo well can include one or more generated seismic attribute responses for the pseudo well. In general, if a set of seismic attribute responses for a well exhibits a patterned behavior, the patterned behavior can be used to predict reservoir properties of the well. However, using human eyes or conventional computer algorithms to determine such patterned behavior may be inaccurate, tedious, and unrealistic. Getting back to the FAVO example, determining/identifying patterned behavior within a set of FAVO responses can be unrealistic because each FAVO response can be multi-dimensional as a result of being a function of multiple geological layer properties, as compared to responses determined based on conventional seismic interpretation methods. Unlike FAVO responses, responses based on conventional seismic interpretation methods may be a function of a single geological layer property. As such, instead of using human eyes or conventional computer algorithms, a machine learning model of one or more embodiments can also be trained to predict the reservoir properties of, for example, the wells of the reservoir, based on the set of FAVO or other seismic attribute responses.

In particular, deep learning computational models, like Convoluted Neural Networks (CNN), or Long Short-Term Memory networks (LSTM) and/or a type of Recurrent Neural Networks (RNN), can implement deep structures that mimic the learning process in a human brain. Such deep learning models have been proven effective in determining intricate structures in multi-dimensional (e.g., multi-variable) data. For example, recently, deep learning techniques have produced encouraging results in the image and speech recognition fields. One or more embodiments implement deep learning models that add multiple hidden layers with a different set of neurons for each layer to a simple neural network model, resulting in a deep neural network. As described in more detail below, a properly trained deep learning model can receive seismic attributes of a well and then infer/predict the reservoir properties of the well based on the received seismic attributes. For example, one or more embodiments can receive a set of captured seismic attribute responses of a well, and one or more embodiments can generate more effective and accurate predictions of the well's reservoir properties as compared to the predictions generated by manual computation or conventional computer algorithms.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Seismic data may provide valuable information with regard to geological formations, such as the location and/or change of hydrocarbon deposits within a subsurface region of the Earth. Seismic attributes are generated from seismic data to enhance the sensitivity of reservoir property to seismic. As discussed above, one type of seismic attribute is the FAVO response. Because FAVO-based seismic analysis is a function of (multiple) geological layer properties (e.g., thickness, seismic velocity, density) and incident wave properties (e.g., angle and frequency), and the geological layer properties may themselves be dependent on reservoir properties (e.g., thickness, lithology, fluid, sand ratio, shale ratio, water ratio, etc.), a FAVO response can be complex valued, which can be represented with real and imaginary components or as an absolute amplitude and phase, as a function of frequency. The FAVO response, then, is multidimensional, which may be rich with information related to the reservoir properties, but which may be difficult to interpret when compared to conventional seismic interpretation methods that may be a function of a single geological layer property, such as conventional amplitude variation with offset (AVO) seismic analysis.

Figure 1:
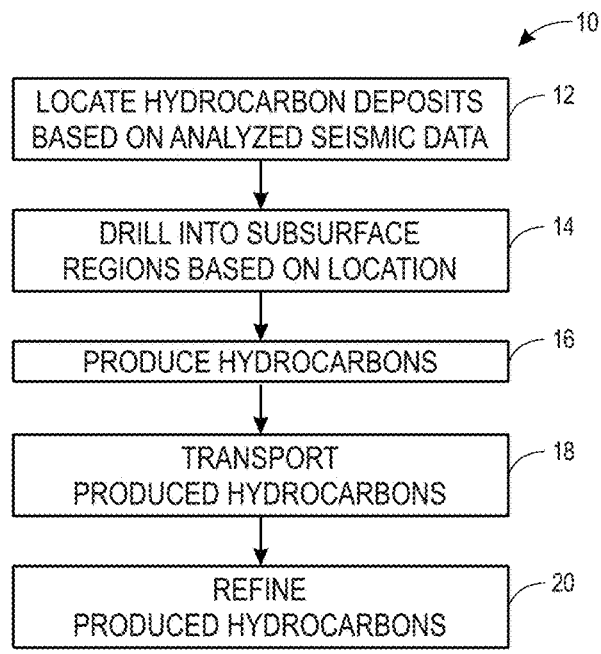
FIG. 1 is a flow chart of various processes that may be performed based on analysis of seismic data acquired via a seismic survey system, in accordance with embodiments presented herein.
Figure 2:
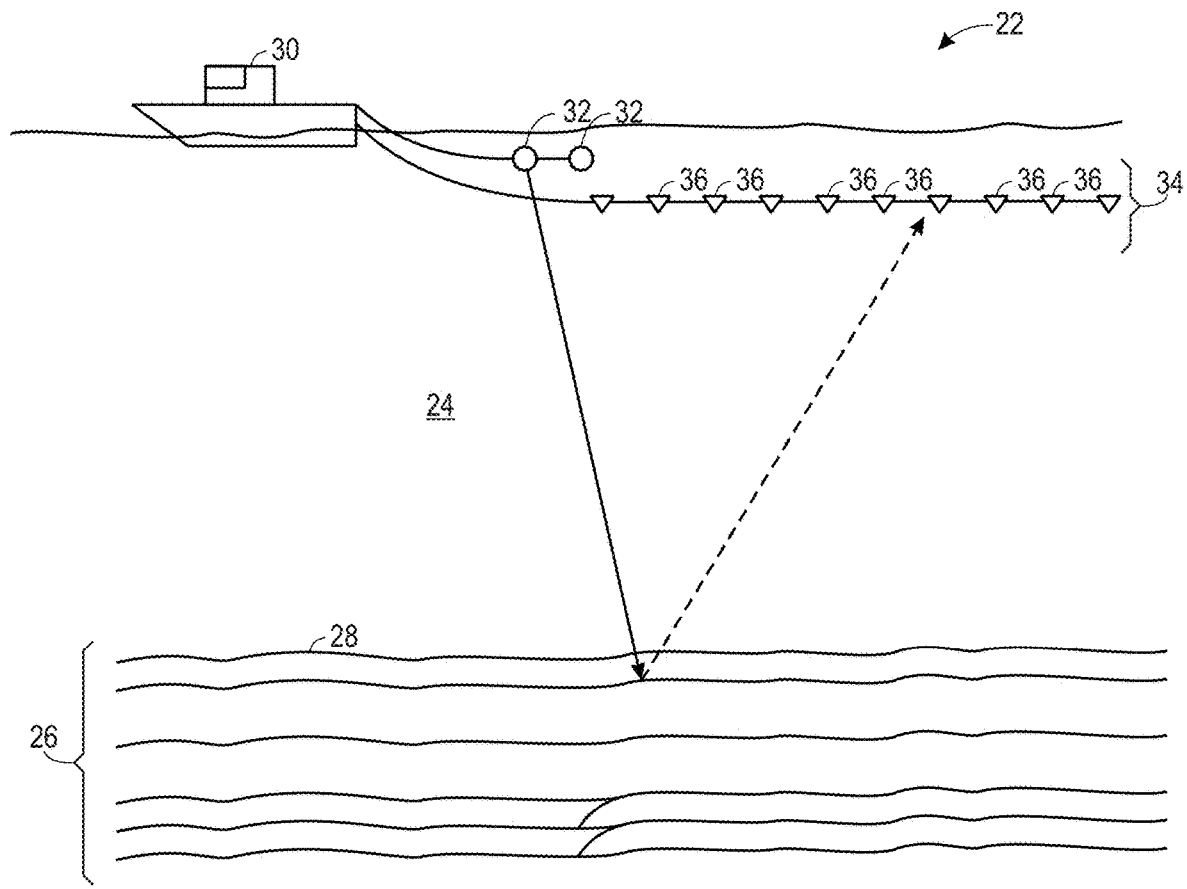
FIG. 2 is a schematic diagram of a marine survey system in a marine environment, in accordance with embodiments presented herein.
Figure 3:
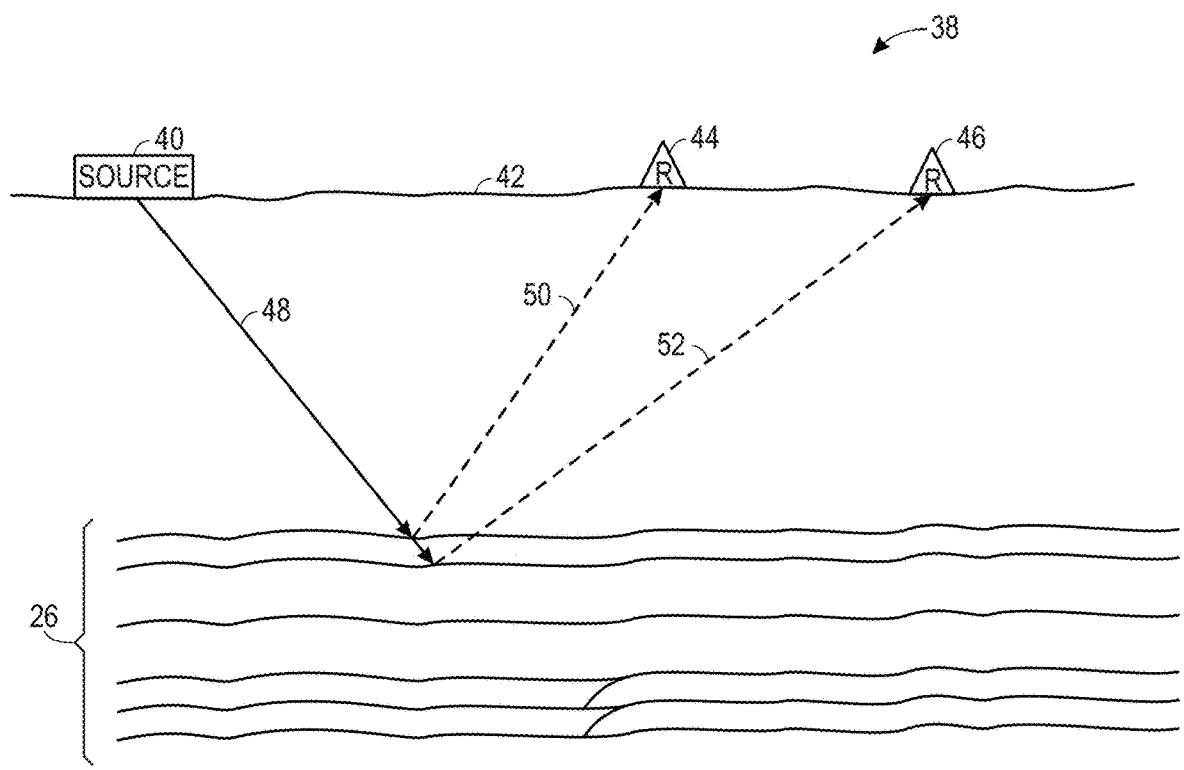
FIG. 3 is a schematic diagram of a land survey system, in accordance with embodiments presented herein

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 is a flow chart of a method 10 that details various processes that may be undertaken based on the analysis of the acquired seismic data. Although the steps of method 10 are described in a particular order, it should be noted that the steps of method 10 may be performed in any suitable order.

Referring now to FIG. 1, at block 12, locations and properties of hydrocarbon deposits within a subsurface region of the Earth associated with the respective seismic survey may be determined based on the analyzed seismic data. In some embodiments, a machine learning model may predict the locations and/or properties of hydrocarbon deposits within the subsurface region by analyzing seismic attributes such as, for example, FAVO responses.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to method 10 may include other suitable processes that may be based on the locations and properties of hydrocarbon deposits as indicated in the seismic data acquired via one or more seismic surveys. As such, it should be understood that the processes described above are not intended to depict an exhaustive list of processes that may be performed after determining the locations and properties of hydrocarbon deposits within the subsurface region.

With the foregoing in mind, FIG. 2 is a schematic diagram of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Although the above descriptions of the marine survey system 22 are described with one seismic streamer 34, it should be noted that the marine survey system 22 may include multiple seismic streamers 34. In addition, additional vessels 30 may include additional sources 32, streamers 34, and the like to perform the operations of the marine survey system 22.

FIG. 3 is a schematic diagram of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include one or more multiple seismic sources 40 and one or more receivers 44 and 46. Indeed, for discussion purposes, the land survey system 38 includes a land-based seismic source 40 and two seismic receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
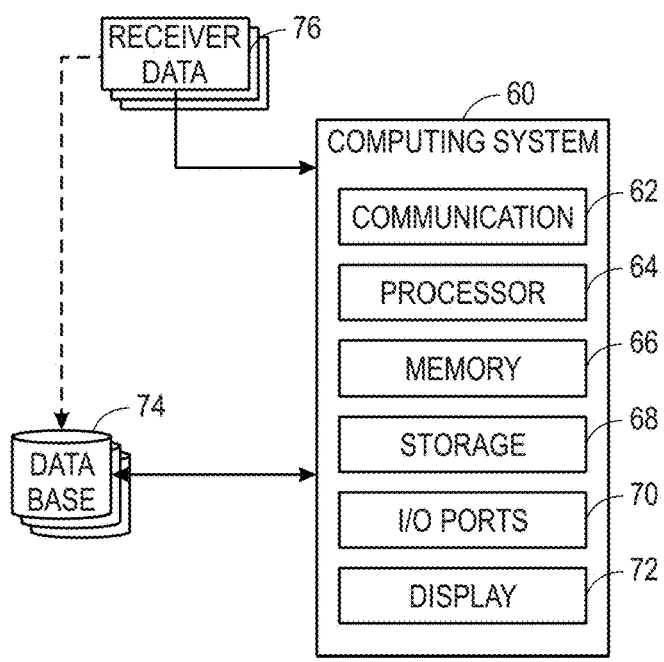
FIG. 4 is a block diagram of a computing system that may perform operations described herein based on data acquired via the marine survey system of FIG. 2 and/or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the receivers 36, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 36, 44, 46 to determine the structure and/or predict reservoir properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 36, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

With one or more embodiments, processor 64 can support the implementation of a neural network. A data structure representing a neural network can be stored by one or more embodiments. The neural network can include, at least, a number of input nodes, a number of output nodes, a number of hidden nodes, and interconnections between the nodes. The nodes or interconnections can be adaptively weighted. With one or more embodiments, the neural network can be a feedforward neural network. By changing the adaptive weights, the neural network can be trained, and thus can implement a machine-learning model. Data can enter the neural network via the input nodes, and a resulting computation can appear on the output nodes. Many different training methods exist for adapting the neural network, and other neural network architectures can exist.

With one or more embodiments, the neural network can be simulated on a processor such as, for example, processor 64. In other embodiments, the neural network (and thus the machine-learning model) can be constructed by using physical hardware processors, circuits, and data links, or by using by using a customized neural network processing chip.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of reservoir properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display component 72 since multiple display components 72 may not be useful to for a supercomputer designed to continuously process seismic data.

After performing various types of seismic data processing, such as FAVO-based seismic analysis, the computing system 60 may store the results, such as one or more sets of FAVO responses, of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the source 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 (e.g., the computing system can be employed to perform a FAVO-based seismic analysis), and to determine and/or predict locations and properties of hydrocarbon deposits. To that end, a variety of seismic data processing algorithms may be used to remove noise from the acquired seismic data, to migrate the pre-processed seismic data, to identify shifts between multiple seismic images, to align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data. As such, the computing system 60 may include a specific improvement to computer-related technology, beyond use of a generic computer in its ordinary capacity. Specifically, the computing system 60 may perform FAVO-based seismic analysis and analyze FAVO-based seismic analysis results using, for example, machine learning. Thus, the computing system 60 may be trained to predict the reservoir properties of, for example, rock and fluid types at a well location, based on a received set of FAVO responses at the well. The predictions performed by one or more embodiments can be more accurate as compared to the predictions that are derived based on perceptions by the human eye or that are derived based on conventional computer algorithms.

Figure 5:
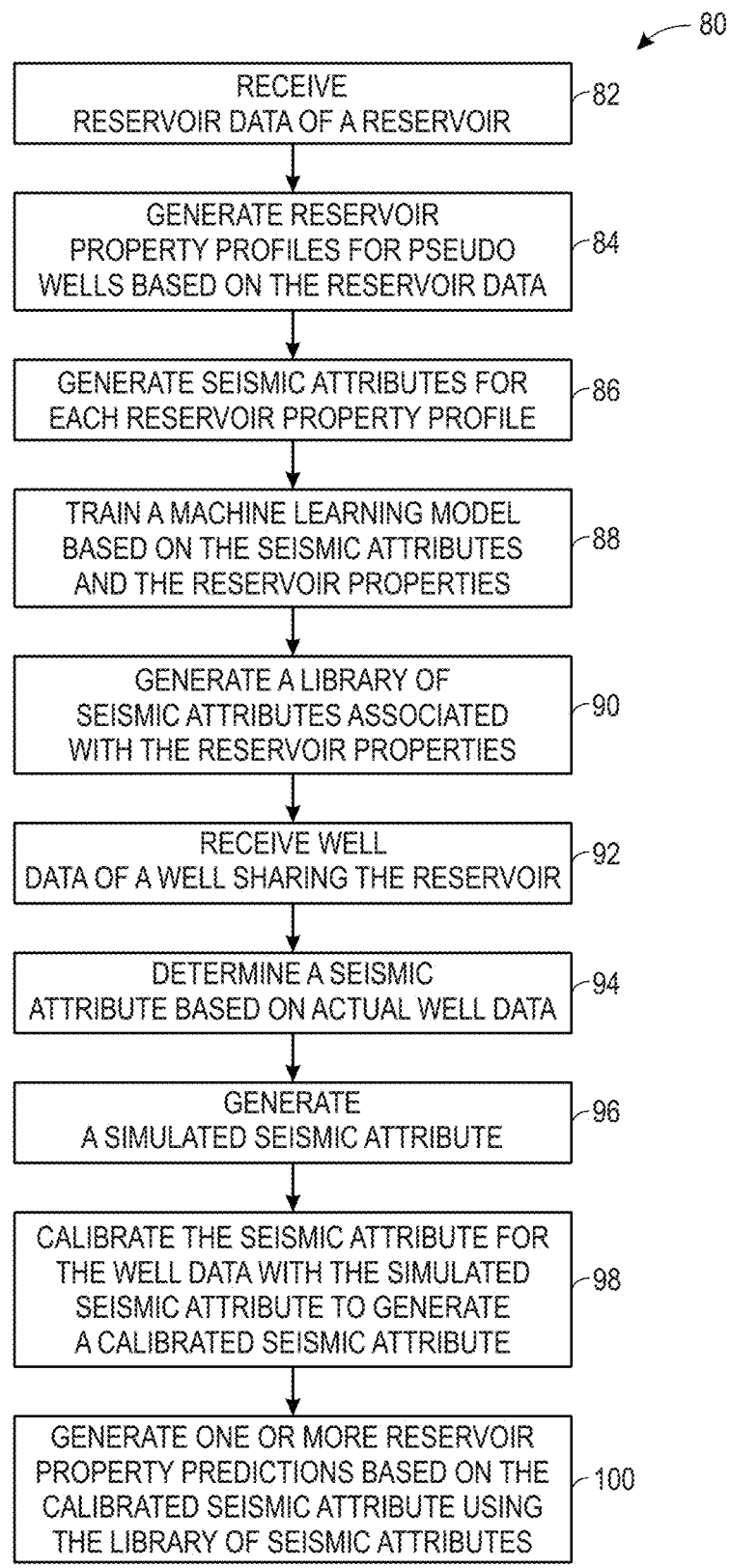
FIG. 5 is a flow chart of a method that may be employed by the computing system of FIG. 4 to predict reservoir property values of wells sharing a hydrocarbon reservoir, in accordance with embodiments presented herein.

With the foregoing in mind, FIG. 5 is a flow chart of a method 80 that may be employed by the computing system 60 to predict one or more reservoir property values of one or more wells, in accordance with one or more embodiments presented herein. In some embodiments, at least some of the steps of the method 80 may be performed in an alternative order or omitted entirely. Moreover, while the steps of the method 80 are described as being performed by the processor 64 of the computing system 60, it should be understood that any suitable devices or systems, or combination of suitable devices or systems, including the processor 64, may perform the steps of the method 80, such as processing units or circuitry of computing devices or systems external to, but communicatively coupled to, the computing system 60 and the execution of the steps of method 80 may involve the processor 64 operating in conjunction with or utilizing software stored on a tangible machine readable medium to perform the steps of method 80.

As illustrated in step 82, the processor 64 may receive data of a reservoir. This reservoir data may include any suitable form of data relating to the reservoir, and, as described above, the reservoir data can include actual data of the subsurface region 26. For example, the reservoir data may include data of a prior distribution of wells which share the reservoir. The reservoir data can include data relating to vertical stacking patterns of different rock types and rock or seismic property trends (e.g., data relating to thickness, lithology, fluid, etc.). In some embodiments, the reservoir data may include well logs (e.g., historical data of actual wells which share the reservoir).

As described above, in order to train a machine learning model to recognize relationships/correlations between seismic attributes and reservoir properties, the machine learning system may compare hundreds or thousands of reservoir property profiles against their corresponding seismic attributes. Further, as described above, in order to obtain these numerous reservoir property profiles to train the machine-learning system, one or more embodiments can generate simulated, pseudo wells. In step 84, the processor 64 may generate reservoir property profiles for a group (e.g., hundreds or thousands) of these simulated or modeled wells (i.e., pseudo wells). The generated reservoir property profiles can be based on actual reservoir data of one or more known wells in a survey. These known wells in the survey can be, for example, known wells that share the reservoir. In this manner, a large amount of (pseudo) data may be acquired in a relatively short amount of time for use in training the machine-learning system. Further, (pseudo) reservoir property profiles can be generated at far less cost and with far less risk as compared to obtaining real-world reservoir property profiles.

As described above, the reservoir property profile of a pseudo well can be based on reservoir data or can be based on the data of other wells which share the same reservoir as the pseudo well. The pseudo wells may simulate any suitable type of well, such as a well with reservoir fluid as gas, brine, oil, Paleo-residual gas, low saturation gas, and the like. The processor 64 may generate one or more reservoir property profiles for pseudo wells, where the one or more reservoir property profiles reflect the reservoir properties for wells which share the reservoir.

A reservoir property profile for the pseudo well may include a variety of reservoir properties (e.g., including the porosity, the fluid saturation, the shale fraction, etc.) of the pseudo well. In some embodiments, the processor 64 may generate (pseudo) reservoir property profiles that provide reservoir property information over a depth of the pseudo well. For example, each reservoir property profile may provide measurements of shale volume (Vsh) of the well at different depths of the pseudo well. It should be understood that the reservoir property profiles may provide any suitable reservoir property or combination of reservoir properties, including, but not limited to, sand fraction, shale fraction, fluid composition, thickness, lithology, porosity (Phit), saturation, primary wave (P-wave) velocity (Vp), secondary wave (S-wave) velocity (Vs), density, etc. The pseudo wells may include any suitable type of well, such as gas, fluid, brine, oil, Paleo-residual gas, low saturation gas, and the like.

At step 86, the processor 64 may generate one or more seismic attributes for each pseudo reservoir property profile. These one or more pseudo seismic attributes may include, for example, frequency-dependent amplitude variation with offset (FAVO) responses. One or more pseudo seismic attributes can be generated for each pseudo reservoir property profile that was generated in step 6 84.

In step 88, the processor 64 may train a machine learning model based on the seismic attributes (e.g., FAVO responses) and the reservoir properties, as explained in detail below. For example, as described above, the machine learning model/system can be trained by comparing sets of seismic attributes against corresponding sets of reservoir properties. In this manner, the machine learning model/system can learn relationships/correlations between seismic attributes and reservoir properties. In some embodiments, the machine learning model may be a deep learning model, though any suitable machine learning model is contemplated.

In step 90, the processor 64 may generate a library of learned associations/correlations between seismic attributes (such as, for example, FAVO responses) and the reservoir properties, which were learned by the machine learning model. In particular, the processor 64 may use the machine learning model to generate a library of reservoir properties that are correlated with seismic attributes. Using the machine learning model to generate the library of correlated reservoir properties and seismic attributes represents a specific improvement over conventional systems, and an improved computing system 60 having improved functionality. In particular, training the machine learning model by using seismic attributes and reservoir properties of pseudo wells improves accuracy and efficiency in predictions by the computing system 60 when compared to performing the analysis by, for example, computer systems performing conventional computer algorithms.

After the machine learning model has been trained using simulated, pseudo-well data, the machine learning model can then receive input in the form of information relating to actual, real-life seismic regions. The trained machine learning model can then generate predictions relating to the actual, real-life seismic regions based on the machine learning model's earlier training. In step 92, the processor 64 may receive actual, real-life well data of a well sharing the reservoir. In step 94, the processor 64 may determine a seismic attribute based on the actual well data. Any suitable seismic attribute may be determined by the processor 64, such as, for example, a FAVO response at the well.

In order to predict reservoir properties with one or more embodiments, in step 96, the processor 64 can generate a simulated seismic attribute (e.g., a simulated FAVO response) to accompany the determined seismic attribute that is based on the actual well data. Next, in step 98, the processor 64 may calibrate the determined seismic attribute that is based on the actual well data (e.g., the determined FAVO response) by using the simulated seismic attribute. For example, the processor 64 can average the values of the determined FAVO response with the simulated FAVO response. The resulting calibrated FAVO response (of measured seismic data) can be a more accurate and/or a more useful FAVO response (for inputting into the trained machine learning model) due to, for example, the removal of noise, removal of inaccurate reservoir property values, removal of undesirable changes in reservoir property values, and the like, as compared to merely inputting the actual determined FAVO response into the trained machine learning model. Proper calibration between the real and the simulated seismic attributes at the real well location can be performed by one or more embodiments.

In step 100, the processor 64 may generate one or more reservoir property predictions/inferences based on the real-life inputted seismic attributes (which can be a calibrated FAVO response or an un-calibrated FAVO response, for example). The predictions/inferences can be generated based on the library of learned associations/correlations between seismic attributes and reservoir properties. That is, the processor 64 may use the library to generate a prediction of reservoir properties that are predicted to exist based on the inputted seismic attributes. For example, the processor 64 may output one or more predictions of reservoir property values corresponding to the inputted calibrated/un-calibrated FAVO response by utilizing the machine learning model. In this manner, the computing system 60 may employ the method 80 to predict one or more reservoir properties from real-life seismic values of wells sharing a hydrocarbon reservoir.

Figure 9:
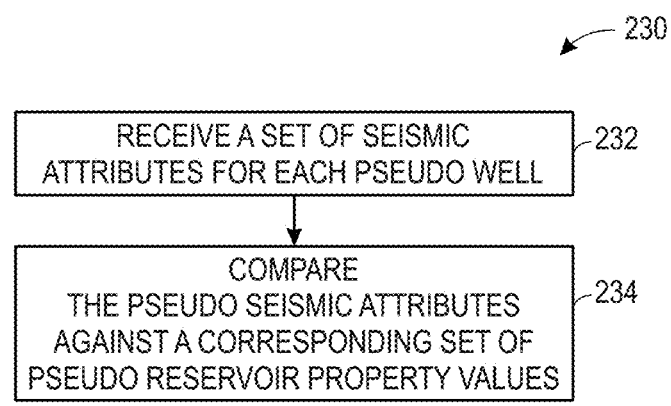
FIG. 9 is a flow chart of a method that may be employed by the computing system of FIG. 4 to train a machine learning model based on seismic attributes and reservoir properties, in accordance with embodiments presented herein.

FIG. 9 is a flow chart of a method 230 that may be employed by the computing system 60 to train the machine learning model based on inputted seismic attributes and inputted reservoir properties, in accordance with embodiments presented herein and as described above in step 88 of FIG. 5.

In some embodiments, at least some of the steps of the method 230 may be performed in an alternative order or omitted entirely. Moreover, while the steps of the method 230 are described as being performed by the processor 64 of the computing system 60, it should be understood that any suitable devices or systems, or combination of suitable devices or systems, including the processor 64, may perform the steps of the method 230, such as processing units or circuitry of computing devices or systems external to, but communicatively coupled to, the computing system 60.

As illustrated in step 232, to train the machine learning model based on the seismic attributes (e.g., FAVO responses) and the reservoir properties, the processor 64 may receive a set of seismic attributes for each pseudo well. In a combined FAVO response, one or more FAVO responses for the pseudo well can be combined together. That is, for each pseudo well, the processor 64 may combine one or more FAVO responses associated with the pseudo well.

In some embodiments, certain portions of the FAVO responses may be extracted before being combined to generate the combined FAVO response in order to reduce an amount of processing power that is used to process the combined FAVO response or to save memory space. These portions may be selected based on typical prediction usage. For example, the processor 64 may extract real and imaginary components of each FAVO response (e.g., for several frequency components) corresponding to 10, 20, and 30 degrees to generate the combined FAVO response, as these angles may correspond to typical angle stacks that might be used (and available) for prediction. The processor 64 may then combine these extracted portions to generate the combined FAVO response for each pseudo well (e.g., to generate a combined FAVO signature for each pseudo well, which may be, for example, represented as a vector).

In step 234, the processor 64 may then train a machine learning model by comparing the pseudo seismic attributes (e.g., the combined FAVO responses) against a corresponding set of pseudo reservoir property values. The machine learning model can determine patterns/relationships/correlations that map the seismic attributes to the corresponding reservoir property values. This way, the machine learning model may be trained to associate certain seismic attributes with reservoir properties. The machine learning model can also be trained to recognize changing seismic attributes with future reservoir property values, thus enabling the machine learning model to more accurately predict future reservoir property values based on changing seismic attributes and/or changing reservoir property values. As another example, the processor 64 may input changing seismic attributes and a total porosity height (PhitH) in gas wells to the machine learning model so that the machine learning model determines patterns which map the changing seismic attribute values to the total porosity height. This way, the machine learning model may be trained to associate changing reservoir property values with future total porosity height, thus enabling the machine learning model to more accurately predict changing reservoir property values based on a future total porosity height. As yet another example, the processor 64 can predict reservoir properties such as an amount of different fluids (e.g., brine, oil, water, etc.).

Figure 6:
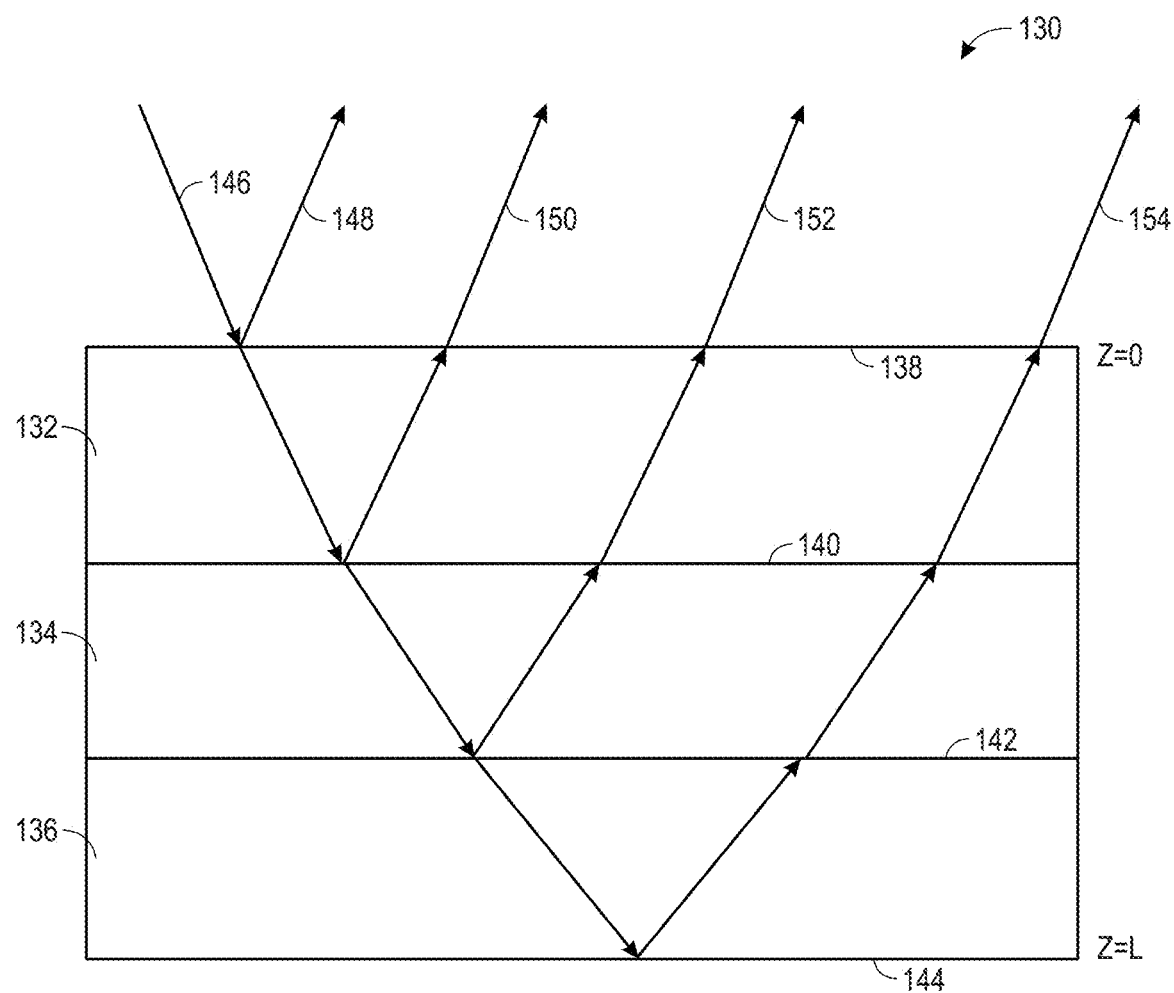
FIG. 6 is a schematic diagram showing an example of scattered waves in a reservoir of thickness L, where the characteristics of the scattering can be captured by a frequency-dependent amplitude variation with offset (FAVO) response, in accordance with embodiments presented herein

FIG. 6 is a schematic diagram showing an example of scattered waves, where the characteristics of the scattering can be captured by a FAVO response. As illustrated in FIG. 6, a reservoir 130 has a thickness (Z) of L, in accordance with embodiments presented herein. The reservoir 130 includes three layers 132, 134, 136 having varying thicknesses, seismic velocity, and density. As such, there are four seismic reflectors 138, 140, 142, 144 for an incident P-wave 146 applied at the top of the reservoir 130. The seismic reflectors 138, 140, 142, 144 generate reflected waves 148, 150, 152, and 154 from the incident P-wave 146.

Conventional seismic interpretation techniques, such as conventional amplitude variation with offset (AVO) seismic analysis, typically model only the top reservoir layer 132. FAVO-based seismic analysis may model all layers 132, 134, 136 by considering an appropriate phase (e.g., time delay) from each layer 132, 134, 136, resulting in the complex frequency-dependent seismic values associated with the reflected waves 148, 150, 152, and 154.

Figure 7:
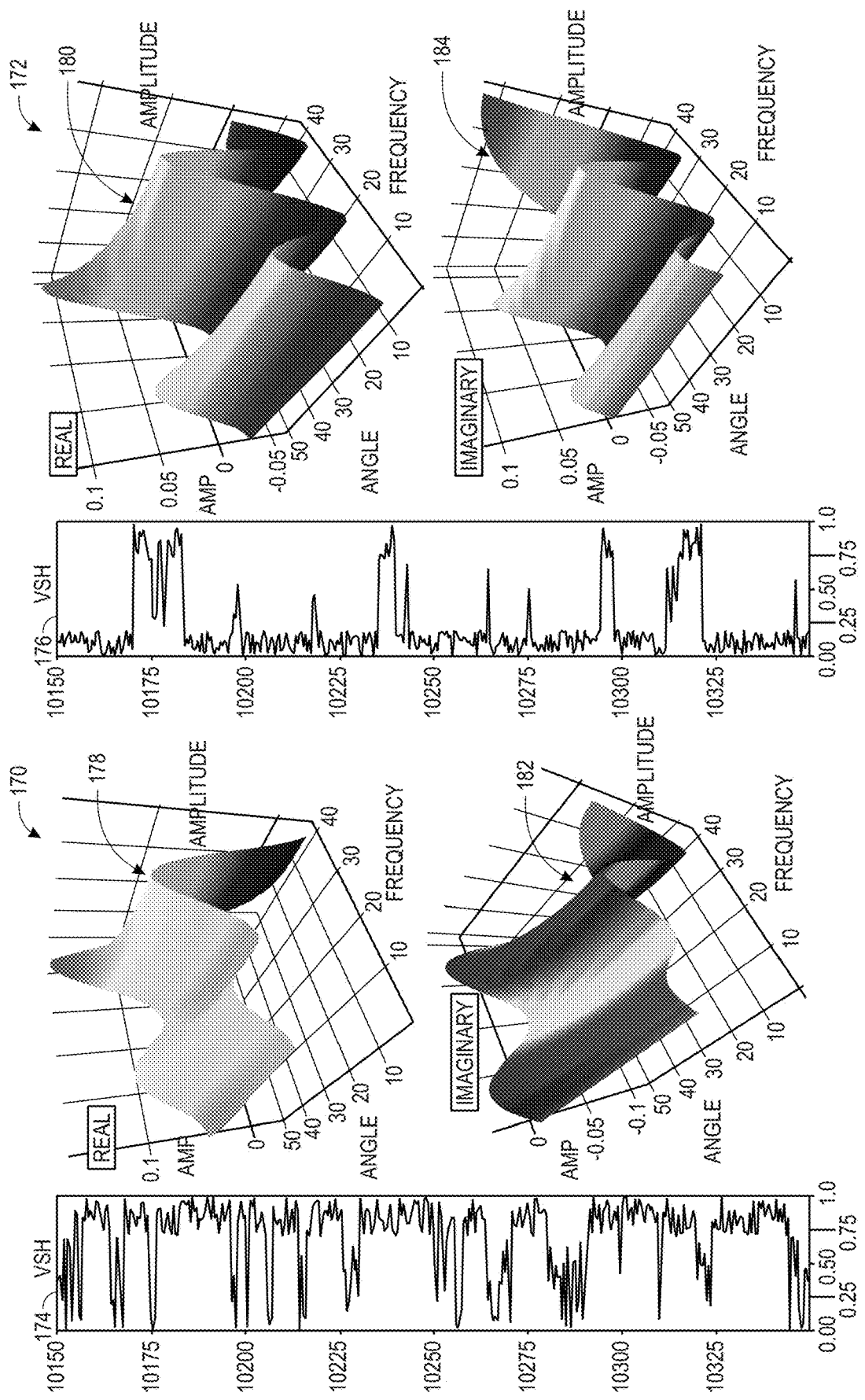
FIG. 7 is a set of plots of an example FAVO response of a shaley well and an example FAVO response of a sandy well, along with the corresponding reservoir properties, in accordance with embodiments presented herein.

A FAVO response (that captures the characteristics of the reflections/scattering) can be represented as real and imaginary components in terms of frequency, amplitude, and angle. For example, FIG. 7 is a set of plots of an example FAVO response 170 of a shaley (e.g., shale intensive formation) well and an example FAVO response 172 of a sandy (e.g., sand intensive formation) well as functions of a reservoir property (specifically shale volume (Vsh), as illustrated), in accordance with embodiments presented herein (e.g., additional examples of the FAVO responses generated in step 86). For reference, respective shale volume (Vsh) curves 174, 176 are shown next to the FAVO responses 170, 172. The plots illustrate reflectivity in the FAVO responses 170, 172 as a function of angle and frequency, and include real components 178, 180 and imaginary components 182, 184.

Figure 8:
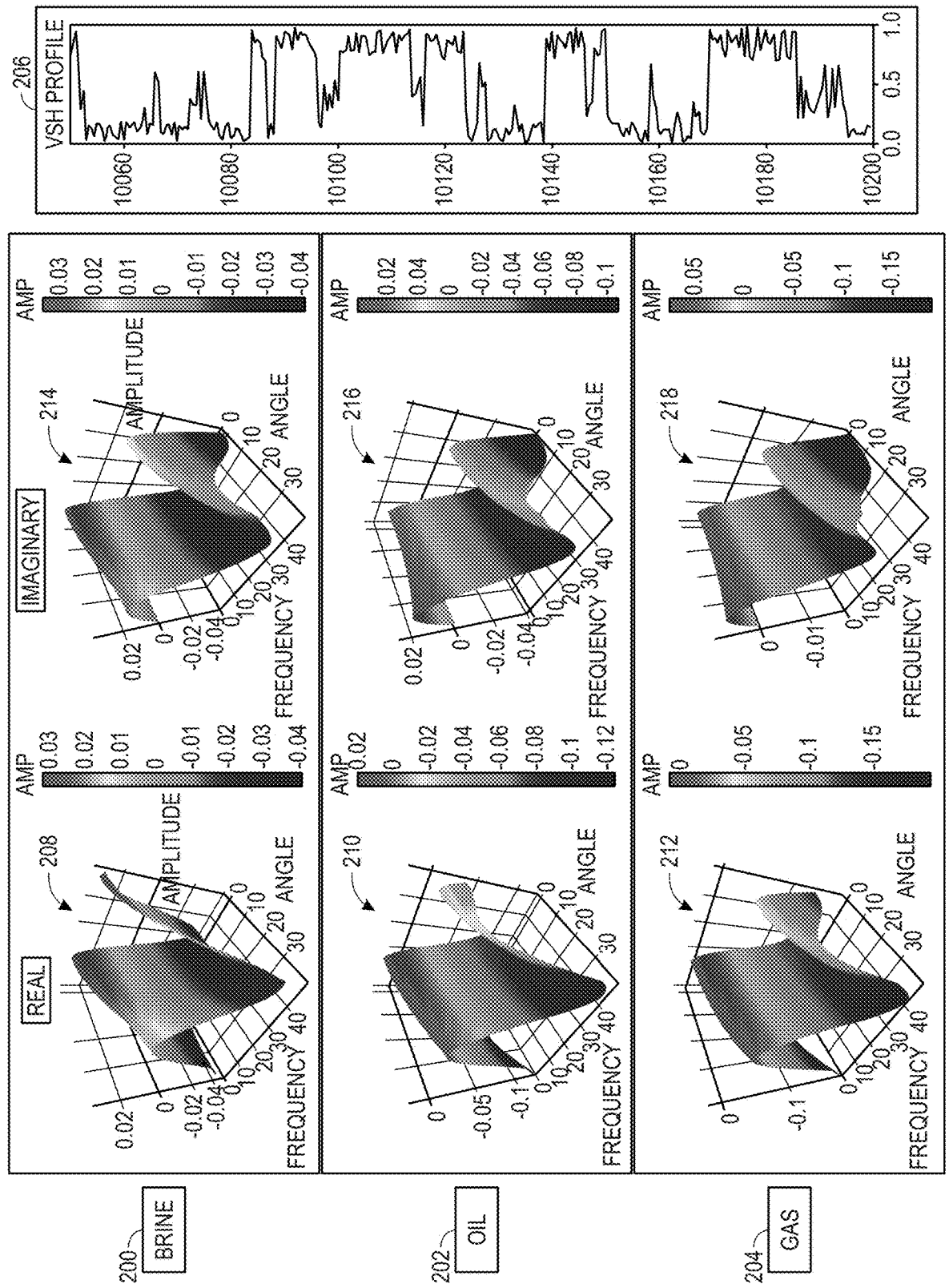
FIG. 8 is a set of plots of example FAVO responses when fluid is changing in a well, along with the corresponding reservoir property profile, in accordance with embodiments presented herein.

FIG. 8 is a set of plots of example FAVO responses 200, 202, 204 when fluid (e.g., brine, oil, gas, and the like) is changing in a well for a given reservoir property profile (Vsh curve), in accordance with embodiments presented herein (e.g., further examples of the FAVO responses generated in step 86). The example reservoir property of FIG. 8 is a shale fraction (Vsh) curve 206, which is shown next to the FAVO responses 200, 202, 204. The FAVO responses 200, 202, 204 illustrate the amount of brine, oil, and gas in the well at a given depth. As with FIG. 8, the FAVO responses 200, 202, 204 illustrate reflectivity as a function of angle and frequency, and include real components 208, 210, 212 and imaginary components 214, 216, 218. The differences of the FAVO responses (200, 202, 204) in the presence of brine, oil, and gas can be very subtle. As such, the human eye and conventional computer algorithms may not be able to discern that the shape of the FAVO response for oil 202 is different from the FAVO response for gas 204. However, as described above, the machine-learning system of one or more embodiments can efficiently discern between different shapes.

Using the disclosed techniques to analyze the FAVO responses via a machine learning model to determine patterned behavior on which to base predictions of reservoir properties may result in more accurate predictions in a more efficient manner, particularly when compared to performing the analysis by, for example, human eyes or by conventional computer algorithms. The disclosed techniques may be implemented in a particular way of programming or designing software in, for example, the memory 66 of the computing system 60, for execution by the processor 64, to generate FAVO responses for reservoir property profiles, train a machine learning model based on the FAVO responses and reservoir property profiles, and predict reservoir property values based on the FAVO responses of measured seismic data. In some embodiments, the computing system 60 may include particular logic (e.g., implemented in hardware and/or software) that is specially designed to perform the functions of the disclosed techniques, such as a FAVO generation logic that generates FAVO responses for reservoir property profiles, machine learning training logic that trains a machine learning model based on the FAVO responses and reservoir property profiles, and prediction logic that predicts reservoir property values based on the FAVO responses. This logic may include non-abstract improvements over conventional computer technology by performing their respective tasks in a quicker, more efficient manner based on being specially designed for these tasks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. A system, comprising:
a processor configured to:
generate a plurality of reservoir property profiles for a plurality of pseudo wells, wherein each reservoir property profile of the plurality of reservoir property profiles comprises reservoir properties of a pseudo well of the plurality of pseudo wells;

generate a plurality of attributes for the plurality of pseudo wells, wherein the plurality of attributes comprise a frequency-dependent amplitude variation with offset (FAVO) response of each pseudo well of the plurality of pseudo wells, wherein at least one FAVO response corresponds to at least one reservoir property; and train a machine learning model to predict reservoir properties for use with seismic exploration above a region of a subsurface containing structural or stratigraphic features conducive to a presence, migration, or accumulation of hydrocarbons by comparing the plurality of reservoir property profiles against the plurality of attributes.

2. The system of claim 1, wherein the plurality of reservoir property profiles are generated based on received reservoir data, and the reservoir data corresponds to data of a hydrocarbon reservoir.

3. The system of claim 1, wherein each reservoir property profile of the plurality of reservoir property profiles is generated for a respective reservoir property for each pseudo well of the plurality of pseudo wells.

4. The system of claim 1, wherein the processor is configured to generate the plurality of reservoir property profiles for the plurality of pseudo wells by:
generating a plurality of well profiles for the plurality of pseudo wells;
determining the at least one reservoir property; and
generating each reservoir property profile of the plurality of reservoir property profiles for each reservoir property of the at least one reservoir property for each well profile of the plurality of well profiles.

5. The system of claim 4, wherein each well profile of the plurality of well profiles is configured to provide reservoir property information over a depth of a respective pseudo well of the plurality of pseudo wells, wherein the reservoir property information comprises sand fraction, shale fraction, fluid composition, thickness, lithology, porosity, saturation, primary P-wave velocity, secondary S-wave velocity, density, or any combination thereof.

6. The system of claim 4, wherein each reservoir property of the set of reservoir properties comprises sand fraction, shale fraction, fluid composition, thickness, lithology, porosity, saturation, primary P-wave velocity, secondary S-wave velocity, density, or any combination thereof.

7. A method comprising:
generating a plurality of reservoir property profiles for a plurality of pseudo wells, wherein each reservoir property profile of the plurality of reservoir property profiles comprises reservoir properties of a pseudo well of the plurality of pseudo wells;
generating a plurality of attributes for the plurality of pseudo wells, wherein the plurality of attributes comprise a frequency-dependent amplitude variation with offset (FAVO) response of each pseudo well of the plurality of pseudo wells, wherein at least one FAVO response corresponds to at least one reservoir property; and
training a machine learning model to predict reservoir properties for use with seismic exploration above a region of a subsurface containing structural or stratigraphic features conducive to a presence, migration, or accumulation of hydrocarbons by comparing the plurality of reservoir property profiles against the plurality of attributes.

8. The method of claim 7, wherein the plurality of reservoir property profiles are generated based on received reservoir data, the reservoir data corresponds to data of a hydrocarbon reservoir, the reservoir properties comprise sand fraction, shale fraction, fluid composition, thickness, lithology, porosity, saturation, primary wave velocity, secondary wave velocity, density, or any combination thereof.

9. The method of claim 7, wherein the reservoir data comprises sand fraction, shale fraction, fluid composition, thickness, lithology, porosity, saturation, primary P-wave velocity, secondary S-wave velocity, density, or any combination thereof.

10. The method of claim 7, comprising generating a library of seismic attributes associated with the reservoir properties.

11. The method of claim 10, comprising receiving well data of a well sharing the hydrocarbon reservoir.

12. The method of claim 11, comprising generating a seismic attribute based on the well data.

13. The method of claim 12, comprising generating a simulated seismic attribute.

14. The method of claim 13, comprising calibrating the seismic attribute with the simulated seismic attribute to generate a calibrated seismic attribute.

15. The method of claim 14, comprising generating one or more reservoir property predictions based on the calibrated seismic attribute using the library of seismic attributes.

16. A non-transitory computer-readable medium comprising instructions configured to cause a processor to:
generate a plurality of reservoir property profiles for a plurality of pseudo wells, wherein each reservoir property profile of the plurality of reservoir property profiles comprises reservoir properties of a pseudo well of the plurality of pseudo wells;
generate a plurality of attributes for the plurality of pseudo wells, wherein the plurality of attributes comprise a frequency-dependent amplitude variation with offset (FAVO) response of each pseudo well of the plurality of pseudo wells, wherein at least one FAVO response corresponds to at least one reservoir property;
train a machine learning model to predict reservoir properties for use with seismic exploration above a region of a subsurface containing structural or stratigraphic features conducive to a presence, migration, or accumulation of hydrocarbons by comparing the plurality of reservoir property profiles against the plurality of attributes.

17. The non-transitory computer-readable medium of claim 16, comprising instructions to cause the processor to combine at least portions of two or more attributes of the plurality of attributes associated with a respective pseudo well of the plurality of pseudo wells together to generate a plurality of combined attributes, wherein the plurality of reservoir property profiles are generated based on received reservoir data, the reservoir data corresponds to data of a hydrocarbon reservoir.

18. The non-transitory computer-readable medium of claim 17, comprising instructions to cause the processor to extract at least the portions of the two or more attributes prior to combining the two or more attributes together.

19. The non-transitory computer-readable medium of claim 17, wherein the portions comprise real and imaginary components of each attribute of the two or more attributes associated with angle stacks used for prediction.

20. The non-transitory computer-readable medium of claim 17, wherein comparing the plurality of reservoir property profiles against the plurality of attributes comprises comparing the plurality of reservoir property profiles against the plurality of combined attributes.

* * * * *